(12) United States Patent
Peet

(10) Patent No.: US 8,465,060 B2
(45) Date of Patent: Jun. 18, 2013

(54) ASSEMBLY COMPRISING FIRST AND SECOND FASTENERS AND A BAULKING ELEMENT

(75) Inventor: Steven E. Peet, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/216,795

(22) Filed: Aug. 24, 2011

(65) Prior Publication Data

US 2012/0068453 A1    Mar. 22, 2012

(30) Foreign Application Priority Data

Sep. 22, 2010  (GB) .................................. 1015827.7

(51) Int. Cl.
*F16L 23/00* (2006.01)

(52) U.S. Cl.
USPC ........................................ 285/410; 285/407

(58) Field of Classification Search
USPC ................. 285/410, 420, 367, 407, 419, 373, 285/81; 24/284, 285; 403/316; 411/114
See application file for complete search history.

(56) References Cited

U.S. PATENT DOCUMENTS

| | | | | |
|---|---|---|---|---|
| 700,704 A * | 5/1902 | Parker | | 217/95 |
| 2,659,953 A | 11/1953 | Woolsey | | |
| 2,757,023 A * | 7/1956 | Hein | | 285/31 |
| 3,600,770 A * | 8/1971 | Halling | | 24/279 |
| 3,797,836 A * | 3/1974 | Halling | | 285/367 |
| 4,739,542 A * | 4/1988 | Krzesicki | | 24/285 |
| 5,454,606 A * | 10/1995 | Voss et al. | | 285/367 |
| 5,509,702 A * | 4/1996 | Warehime et al. | | 285/409 |
| 5,513,228 A * | 4/1996 | Malmasson | | 376/203 |
| 5,645,303 A * | 7/1997 | Warehime et al. | | 285/409 |
| 5,658,021 A * | 8/1997 | Matsumoto et al. | | 285/112 |
| 5,711,639 A * | 1/1998 | Tessier et al. | | 405/171 |
| 5,873,611 A * | 2/1999 | Munley et al. | | 285/367 |
| 7,219,934 B2 * | 5/2007 | McMahon et al. | | 285/420 |
| 7,891,713 B2 * | 2/2011 | Bekkevold | | 285/406 |
| 7,997,626 B2 * | 8/2011 | Krausz et al. | | 285/110 |
| 8,033,579 B2 * | 10/2011 | Takeda et al. | | 285/367 |
| 8,042,234 B2 * | 10/2011 | Rigollet et al. | | 24/280 |
| 2011/0215574 A1 * | 9/2011 | Prevot et al. | | 285/420 |

FOREIGN PATENT DOCUMENTS

FR   2.120.804 A5   8/1972
GB   2 446 813 A    8/2008

OTHER PUBLICATIONS

Nov. 25, 2011 European Search Report issued in European Patent Application No. 11 17 8578.

* cited by examiner

*Primary Examiner* — Aaron Dunwoody
(74) *Attorney, Agent, or Firm* — Oliff & Berridge, PLC

(57) ABSTRACT

An assembly includes a first seat, a second seat, a first fastener which fastens against the first seat, a second fastener which fastens against the second seat, and a baulking element disposed between the second fastener and the second seat. The baulking element is arranged with respect to the second fastener and the second seat such that fastening the second fastener against the second seat causes the baulking element to cant from a non-baulking position into a baulking position in which the baulking element prevents further fastening of the first fastener.

13 Claims, 3 Drawing Sheets

ASSEMBLY COMPRISING FIRST AND SECOND FASTENERS AND A BAULKING ELEMENT

BACKGROUND

This invention relates to an assembly comprising first and second fasteners and a baulking element.

It is known to use grooved clamp couplings to secure high pressure and high temperature ducting in engine bleed systems. Grooved clamp couplings typically comprise a pair of hinged jaws which clamp about respective flanges at the ends of the parts to be clamped together. The jaws are secured together at their free ends by a fastener, such as a nut and bolt arrangement. The clamping force exerted by the jaws is controlled by tightening of the fastener. In safety critical applications it is often necessary to provide a redundant fastener which is arranged adjacent the primary fastener.

The coupling is fastened by tightening the redundant fastener and then the primary fastener. This ensures that the clamping force exerted by the jaws and the stress through the coupling and/or fasteners is controlled by tightening of the primary fastener and not the redundant fastener. Consequently, once the primary fastener has been tightened it is important to ensure that the redundant fastener is not tightened further.

Systems that prevent tightening of fasteners in an incorrect sequence are known. For example, it is known to dispose a baulking arm made from sheet metal below the nut of the primary nut and bolt arrangement. The baulking arm is rotatable about the shank of the bolt from a non-baulking position to a baulking position.

The redundant nut is first tightened using a socket wrench. The primary nut is then tightened to push down and rotate the baulking arm over the top of the redundant nut. The baulking arm prevents a socket wrench from being placed over the redundant nut thereby preventing the redundant nut from being tightened further. A coil spring is provided to urge the baulking arm away from the redundant nut so that the baulking arm moves away from the redundant nut when the primary nut is loosened to allow access to the redundant nut. The existing baulking arrangement is complex to manufacture and unreliable. Further, the baulking arm and the spring are easily, damaged or deformed.

SUMMARY

According to a first aspect of the invention there is provided an assembly comprising a first fastener which fastens against a first seat, a second fastener which fastens against a second seat and a baulking element disposed between the second fastener and the second seat, wherein the baulking element is arranged with respect to the second fastener and the second seat such that fastening the second fastener against the second seat causes the baulking element to cant from a non-baulking position into a baulking position in which the baulking element obstructs access to the first fastener.

The baulking element may obstruct access to the first fastener when the first fastener is fastened against the first seat and the baulking element is in the baulking position.

The baulking element may allow access to the first fastener when the first fastener is fastened against the first seat and the baulking element is in the non-baulking position.

The baulking element and the second seat may have respective curved surfaces which cooperate to guide the baulking element from the non-baulking position to the baulking position.

The baulking element and the second fastener may have respective flat surfaces which cooperate to cant the baulking element from the non-baulking position to the baulking position when the second fastener is fastened against the second seat.

The baulking element may be biased towards the non-baulking position.

The baulking element may comprise a protrusion, such as a baulking tab, which extends laterally with respect to the direction in which the second fastener is fastened against the second seat thereby providing an imbalance of the baulking element about the second seat so as to cause the baulking element to tilt under gravity into the non-baulking position when the assembly is in an upright position and the second fastener is released.

The first fastener may have a profiled portion having a non-circular profile for engagement by a fastening tool, the baulking element obstructing access to the profiled portion when in the baulking position. Thus, the baulking element prevents engagement of the profiled portion by the fastening tool.

The second fastener may comprise a nut threaded on a bolt and the baulking element may comprise a spacer element having a bore through which the bolt extends.

The bore may diverge in the direction towards the second seat such that the spacer element can be canted between the baulking position and the non-baulking position.

According to a second aspect of the invention, there is provided a clamp comprising pivotally connected first and second jaws and a fastening assembly according to the first aspect of the invention, wherein the first and second fasteners are disposed at the free ends of the jaws for clamping the jaws together.

For a better understanding of the present invention, and to show more clearly how it may be carried into effect, reference will now be made, by way of example, to the accompanying drawings, in which:—

DETAILED DESCRIPTION OF EMBODIMENTS

Figure 1:
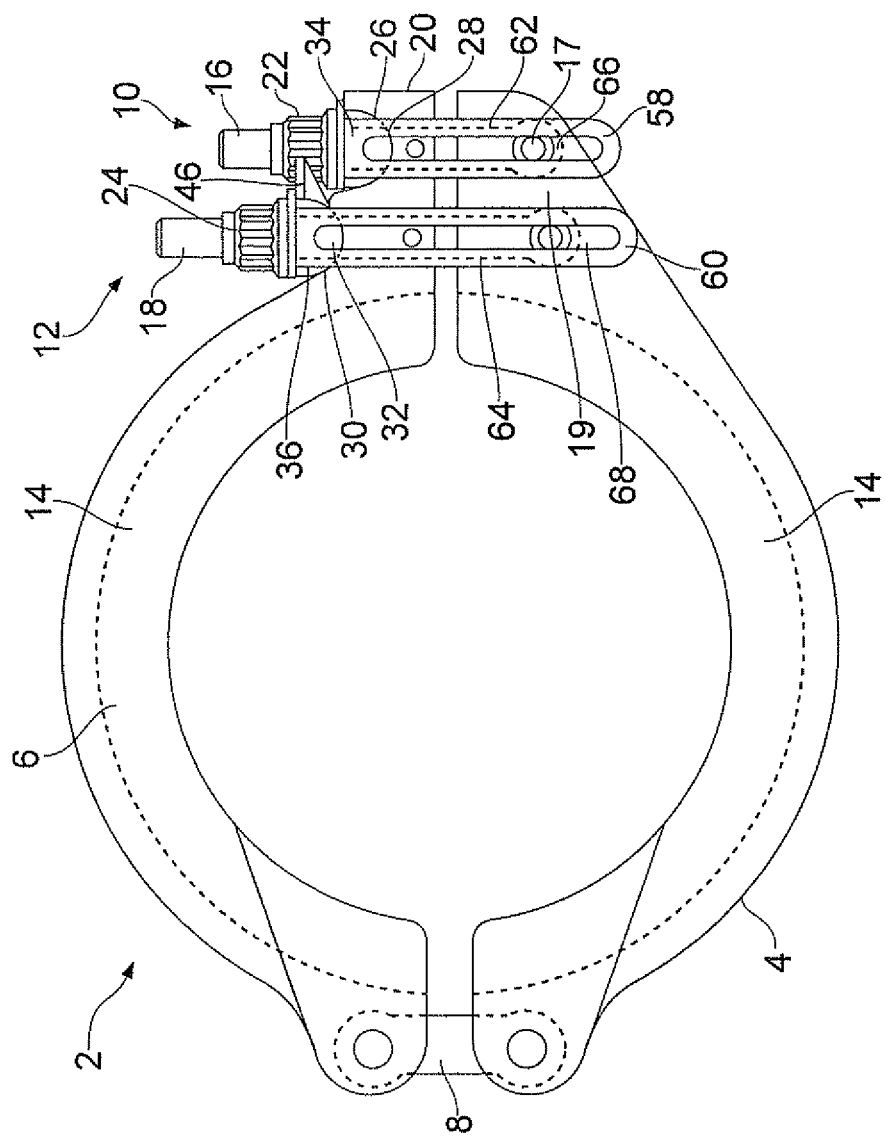
FIG. 1 is a view of an assembly comprising a clamp having first and second fasteners and a baulking element.

FIG. 1 shows a grooved clamp coupling 2 of the type used to secure high pressure and high temperature ducting in engine bleed systems (for example a coupling in accordance with the SAE standard AS1895). The coupling 2 is shown in a clamped configuration. The coupling 2 is annular and defines a central longitudinal axis. The coupling 2 comprises two arcuate jaws 4, 6: a lower jaw 4 and an upper jaw 6. The jaws 4, 6 are connected to each other by a pivot link 8, such as a dog-bone link, so that the jaws 4, 6 can pivot open and closed. The free ends of the jaws 4, 6 abut each other to form a nose of the coupling 2. The free ends of the jaws 4, 6 are connected at the nose of the coupling 2 by first and second fasteners 10, 12.

The first fastener 10 is disposed radially outwardly of the second fastener 12, with respect to the central axis of the coupling 2. The second fastener 12 is a primary fastener for controlling the clamping force applied, and the first fastener 10 is a redundant fastener which provides redundancy in the event of failure of the second (primary) fastener 12. Each jaw 4, 6 is provided with an inwardly facing channel 14, which diverges radially inwardly, for receiving flanged portions of ducting (not shown).

Figure 5:
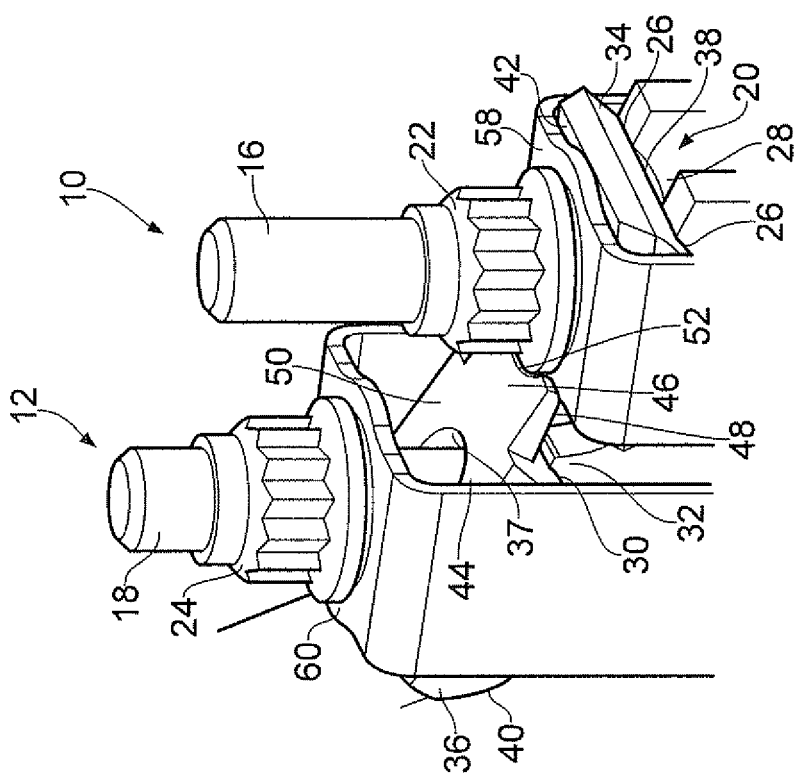
FIG. 5 is a partial perspective view of the assembly as shown in FIG. 3.

Each fastener 10, 12 comprises a bolt 16, 18 and a respective nut 22, 24. Each bolt 10, 12 is pivotally connected to the lower jaw 4 by dowels 17, 19 passing through the lower jaw 4 and the lower ends of the bolts 16, 18. Each bolt 16, 18 may be rotated outwardly away from the nose of the coupling 2. The bolts 16, 18 extend upwardly through a slot 20 provided through the nose region of the upper jaw 6. FIG. 5 is a partial perspective view of the assembly showing the slot 20. The slot 20 extends in a radial direction with respect to the central axis of the coupling 2.

An upper portion of each bolt 16, 18 is threaded to receive a respective nut 22, 24. Each nut 22, 24 has a profiled portion having a non-circular external profile which can be engaged by a tool for tightening the nut. For example, the profiled portion may be a spline drive or similar, as shown in the drawings, for engagement by a socket wrench.

Figure 3:
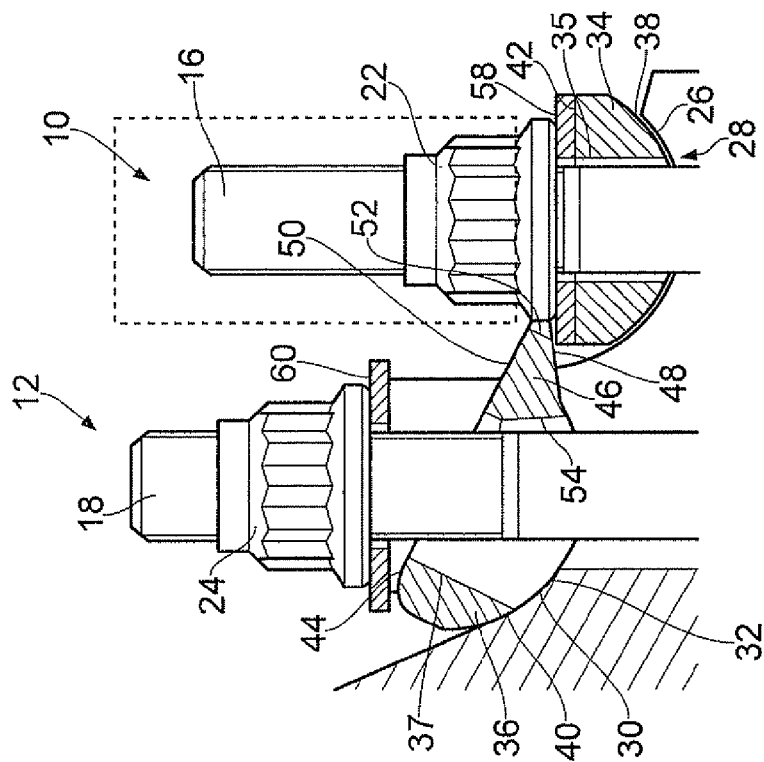
FIG. 3 is a partial sectional view of the assembly as shown in FIG. 2 in a baulking configuration.
Figure 4:
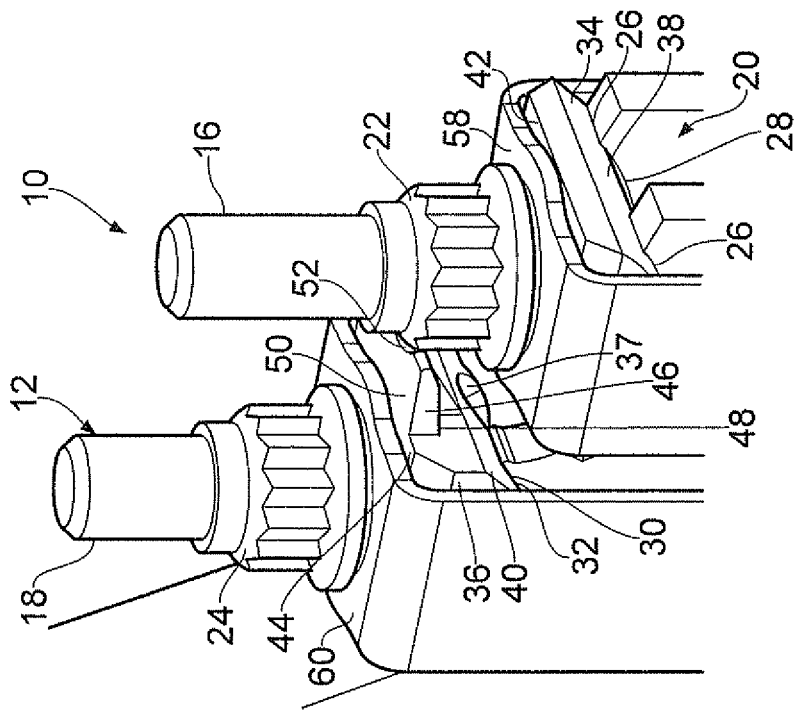
FIG. 4 is a partial perspective view of the assembly as shown in FIG. 2.

As shown in FIG. 3, first bearing surfaces 26 are recessed in an upper surface of the upper jaw 6 on opposite sides of the slot 20. The bearing surfaces 26 are concave in profile and are part-cylindrical, having a constant radius of curvature. The first bearing surfaces 26 together define a first seat 28.

Second bearing surfaces 30 are also recessed in an upper surface of the upper jaw 6 on opposite sides of the slot 20. The second bearing surfaces 30 are disposed radially inwardly from the first bearing surfaces 26 with respect to the central axis of the coupling 2. The second bearing surfaces 30 are also concave and part-cylindrical, having a constant radius of curvature. The second bearing surfaces 30 together define a second seat 32.

The depth of the first seat 28 is greater than that of the second seat 32. Furthermore, the second seat 32 is raised with respect to the first seat 28.

A first spacer 34 is disposed between the first nut 22 and first seat 28, and a second spacer 36 is disposed between the second nut 24 and the second seat 32. As shown in FIG. 3, each spacer 34, 36 is semi-circular in cross section and has a curved lower surface 38, 40 and a flat upper surface 42, 44. The curvature of each lower surface 38, 40 corresponds to the curvature of the respective bearing surfaces 26, 30 of the seats 28, 32. In particular, the lower surfaces 38, 40 of the respective spacers 34, 36 have axes of curvature that are coaxial with the respective bearing surfaces 26 and have radius of curvatures which correspond to the radius of curvatures of the respective bearing surfaces 26, 30.

A bore 35, 37 extends through each spacer 34, 36 to accommodate each of the bolts 16, 18. The diameter of the bore 37 of the second spacer is larger than the diameter of the second bolt 18 so as to provide clearance between the wall of the bore 37 and the bolt 18. The diameter of the bore 37 through the second spacer 36 may, for example, be at least 50% greater than the diameter of the bolt 18 of the second fastener 12. The lower surfaces 38, 40 of the spacers 34, 36 and the bearing surfaces 26, 30 which define the seats 28, 32 cooperate to center the spacers 34, 36 in the seats 28, 32 and to allow rotation of the spacers 34, 36 as the bolts 16, 18 are tightened.

The second spacer 36 comprises a baulking tab 46 which extends outwardly over the periphery of the second seat 30 and towards the first nut 22. The baulking tab 46 is formed integrally with the second spacer 36 and, in the configuration shown in FIGS. 1 and 3, extends perpendicularly with respect to the axis of the bore 37 through the second spacer 36. The baulking tab 46 has a lower surface 48 and an upper surface 50. The upper surface 50 extends in plane with the flat upper surface 44 of the second spacer 36. The lower surface 48 extends upwardly from the lower surface 40 of the second spacer 36 to converge with the upper surface 50 of the baulking tab 46 at a peripheral edge 52. The peripheral edge 52 is arcuate so that it extends partially around the profiled portion of the second nut 24. A lower portion of the wall of the bore 37 adjacent the baulking tab 46 is inclined to the length of the bore 37 so that the bore 37 of the second spacer 36 has a lower portion 56 that diverges in the direction from the upper surface 44 towards the lower surface 40 of the second spacer 36.

First and second failsafe links 58, 60 are disposed respectively between the spacers 34, 36 and corresponding nuts 22, 24. Each failsafe link 58, 60 has an aperture through which the respective bolt 16, 18 extends. The first failsafe link 58, 60 has lobes 62 and the second failsafe link 60 has lobes 64. The lobes 62, 64 extend downwardly from a middle portion of each failsafe link 58, 60 on opposite sides of the lower jaw 6 (see FIG. 1). An elongate aperture 66, 68 is provided through each lobe 58, 60. Each aperture 66, 68 receives an end of one of the dowels 17, 19 which pivotally support the respective bolts 16, 18. The dowels 17, 19 limit lengthwise displacement of the failsafe links 58, 60 with respect to the lower jaw 4.

Prior to use, the jaws 4, 6 of the coupling 2 are open, and the fasteners 10, 12, together with the respective spacers 34, 36 and failsafe links 58, 60 are rotated outwardly away from the nose of the coupling 2. The flanges of the parts to be coupled (not shown) are placed between the channels 14 in the jaws 4, 6 and the lower and upper jaws 4,6 are brought towards each other to hold the flanges together.

Figure 2:
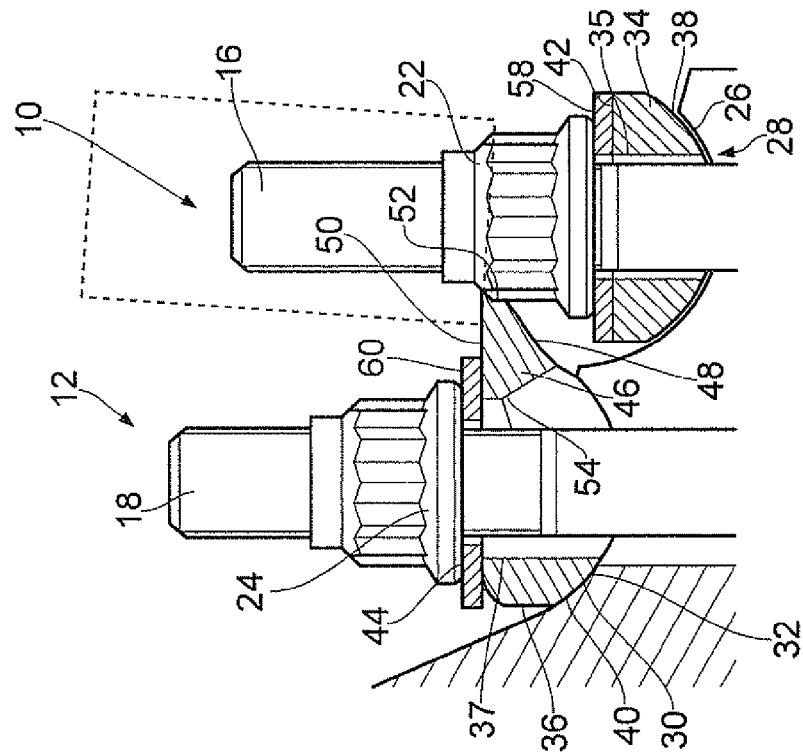
FIG. 2 is a partial sectional view of the assembly shown in FIG. 1 in a non-baulking configuration.

The second fastener 12 and then the first fastener 10, together with the respective spacers 34, 36 and failsafe links 58, 60, are rotated back over the nose of the coupling 2 so that the first and second spacers 34, 36 sit on their corresponding seats 28, 32. The first and second nuts 22, 24 are towards the ends of the respective bolts 16, 18 so that the spacers, 34, 36 sit loosely in the seats 28, 32. With the coupling 2 in an upright position, as shown in the Figures, the weight of the baulking tab 46 unbalances the second spacer 36 causing the second spacer 36 to rotate within the second seat 32 (in a clockwise direction as shown in FIG. 2) until the peripheral edge 52 of the baulking tab 46 rests on the first failsafe link 58. The second spacer 36 is inclined towards the second seat 32 so that the peripheral edge 52 is below the non-circular profile portion of the first nut 22. The portion of the second spacer 36 opposite the baulking tab 46 is raised. The baulking tab 46 thus allows unobstructed access to the nut 22 by a socket wrench and so is in a non-baulking position. In addition, the clearance between the second bolt 18 and the wall of the bore 37 through the second spacer 36 is sufficient to allow the second spacer 36 to be moved further aside from the first nut 22.

A socket wrench (shown in outline in FIG. 2) is placed over the top of the first nut 22 and rotated to clamp the first failsafe link 58 and the first spacer 34 against the first seat 28.

FIG. 2 shows the first nut 22 tightened against the first seat 28, and the baulking tab 46 in the non-baulking position. The second nut 24 is then wound further onto the second bolt 18 to tighten the second failsafe link 60 and the second spacer 36 against the second seat 32. The second failsafe link 54 presses downwardly on the raised portion of the second spacer 36 opposite the baulking tab 46 to cant the second spacer 36 counter-clockwise until the upper surface 50 of the baulking tab 46 is level with the top of the profiled portion of the first nut 22, as shown in FIG. 3. In other words, the second spacer 36 is pivoted about an axis perpendicular to the length of the second bolt 18. The peripheral edge 52 of the baulking tab 46 is adjacent the profiled portion of the first nut 22. The peripheral edge 52 is not in contact with the first nut 22. The gap between the peripheral edge 52 and the first nut 22 is sufficiently narrow to prevent a socket from being placed over the non-profiled portion of the first nut 22 (shown in outline in FIG. 3). Therefore, once the second nut 24 has been tightened, the baulking tab 46 is in a baulking position which prevents a socket from being placed over the first nut 22 to further tighten or loosen the first nut 22. Cooperation of the curved bearing surfaces 30 of the second seat 32 and the curved lower surface 40 of the second spacer 36 ensures that the baulking the 46 is positioned accurately and repeatably.

It will be appreciated that, in the baulking position, it is not necessary for the tab 46 to surround or enclose the first nut 22 so that access to the first nut 22 is entirely prevented. It is sufficient for the baulking tab 46 to be positioned such that access by a socket or other tool normally employed to turn the nut 22 is substantially obstructed. Obstructing access to the first (redundant) nut 22 so as to prevent it from being tightened once the second (primary) nut 24 has been tightened ensures that the nuts 22, 24 are tightened in the correct sequence. In particular, once the primary nut 24 has been tightened, it is no longer possible to turn the redundant nut 22.

Although the above embodiment describes the baulking tab or baulking element being used to prevent a socket from being placed over a nut, it will be appreciated that the baulking element could be used to obstruct access to other types of fastener to prevent or hinder access to the fastener.

Where a nut and bolt type fastener is used, the baulking element could be arranged to obstruct access to a portion of the bolt, for example a bolt head. The baulking element could obstruct access to the sides of a nut/bolt head using an open-end spanner.

One or more of the spacers may be a washer, for example a saddle washer.

A coupling, or other assembly, could comprise three or more fasteners, for example a chain of fasteners, having corresponding baulking elements to ensure that the fasteners are tightened in a predetermined sequence.

The invention claimed is:

1. An assembly comprising:
a first seat;
a second seat;
a first fastener which fastens against the first seat;
a second fastener which fastens against the second seat; and
a baulking element disposed between the second fastener and the second seat, wherein
the baulking element is arranged with respect to the second fastener and the second seat such that fastening the second fastener against the second seat causes the baulking element to cant from a non-baulking position into a baulking position in which the baulking element prevents engagement of a fastening tool with the first fastener.

2. The assembly according to claim 1, wherein the baulking element obstructs access to the first fastener when the first fastener is fastened against the first seat and the baulking element is in the baulking position.

3. The assembly according to claim 1, wherein the baulking element allows access to the first fastener when the first fastener is fastened against the first seat and the baulking element is in the non-baulking position.

4. The assembly according to claim 1, wherein the baulking element and the second seat have respective curved surfaces which cooperate to guide the baulking element from the non-baulking position to the baulking position.

5. The assembly according to claim 1, wherein the baulking element and the second fastener have respective flat surfaces which cooperate to cant the baulking element from the non-baulking position to the baulking position when the second fastener is fastened against the second seat.

6. The assembly according to claim 1, wherein the baulking element is biased towards the non-baulking position.

7. The assembly according to claim 6, wherein the baulking element comprises a protrusion which extends laterally with respect to a direction in which the second fastener is fastened against the second seat thereby providing an imbalance of the baulking element about the second seat so as to cause the baulking element to tilt under gravity into the non-baulking position when the assembly is in an upright position and the second fastener is released.

8. The assembly according to claim 1, wherein
the first fastener has a profiled portion having a non-circular profile for engagement by a fastening tool, and
the baulking element obstructs access of the fastening tool to the profiled portion when in the baulking position.

9. The assembly according to claim 1, wherein
the second fastener comprises a nut threaded on a bolt, and
the baulking element comprises a spacer element having a bore through which the bolt extends.

10. The assembly according to claim 9, wherein the bore diverges in a direction towards the second seat such that the spacer element can be canted between the baulking position and the non-baulking position.

11. A clamp comprising:
pivotally connected first and second jaws, and
the fastening assembly according to claim 1, wherein
the first and second fasteners are disposed at the free ends of the pivotally connected first and second jaws for clamping the pivotally connected first and second jaws together.

12. An assembly comprising:
a first seat;
a second seat;
a first fastener which fastens against the first seat;
a second fastener which fastens against the second seat; and
a baulking element disposed between the second fastener and the second seat, wherein
each of the first and second fasteners have a profiled portion which can be engaged by a tool for tightening the fastener, and
the baulking element is arranged with respect to the second fastener and the second seat such that fastening the second fastener against the second seat causes the baulking element to cant relative to the first fastener from a non-baulking position into a baulking position in which the baulking element obstructs access to the profiled portion of the first fastener by the tool for tightening the fastener.

13. An assembly comprising:
a first substantially concave shaped seat;
a second substantially concave shaped seat;
a first fastener which fastens against the first substantially concave shaped seat;
a second fastener which fastens against the second substantially concave shaped seat; and a baulking element disposed between the second fastener and the second substantially concave shaped seat, wherein the baulking element:
  i) has a shape that is substantially complimentary to the second substantially concave shaped seat, and
  ii) upon fastening of the second fastener, is configured to cant into a baulking position in which the baulking element:
    i) engages with the first fastener, and
    ii) prevents engagement of a fastening tool the first fastener.

\* \* \* \* \*